(No Model.)
R. A. JOHNSON.
Cotton Cultivator.
No. 229,318.        Patented June 29, 1880.
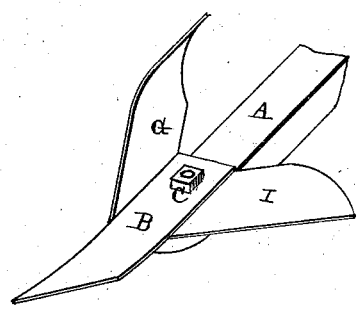
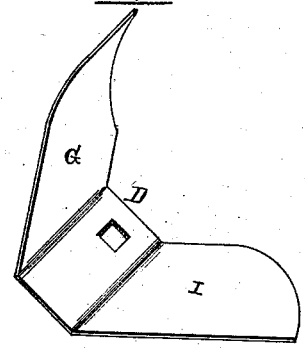
Witnesses:
W. W. Mortimer
W. H. Kern
Inventor:
R. A. Johnson,
per
F. A. Lehmann,
Atty.
N. PETERS, PHOTO-LITHOGRAPHER, WASHINGTON, D. C.

UNITED STATES PATENT OFFICE.

RICHARD A. JOHNSON, OF NEWNAN, GEORGIA.

COTTON-CULTIVATOR.

SPECIFICATION forming part of Letters Patent No. 229,318, dated June 29, 1880.

Application filed May 27, 1880. (No model.)

*To all whom it may concern:*

Be it known that I, RICHARD A. JOHNSON, of Newnan, in the county of Coweta and State of Georgia, have invented certain new and useful Improvements in Cotton-Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-cultivators; and it consists in attaching to the cultivator stock or standard, by the same bolt or bolts which secure the cultivator-point to the standard, a cutter which is so shaped as to extend forward in advance of the plow and cut the earth away from the side of the young cotton-plant, and at the same time serves to prevent any of the earth from being thrown upon the plant, and thus prevent it from being covered up, as will be more fully described hereinafter.

The object of my invention is to enable the cultivator to be run much nearer to the growing cotton than has heretofore been possible without covering it up by the dirt.

Figure 1 is a perspective of my invention. Fig. 2 is a detached view of the guard and cutter alone.

A represents an ordinary plow or cultivator standard, and B the cultivator hoe or tooth. Secured between the upper end of this cultivator and its stock, and by the same bolt C, is the guard and cutter D. This guard and cutter consists of a wing, G, which is turned vertically upward upon the right-hand side of the stock, and a wing, I, which is curved and turned backward in the usual manner. As the cultivator is drawn along through the ground this vertical wing G extends beyond the point where the cultivator would throw the earth upon the young growing cotton, and serves not only to cut the earth away from the side of the growing plants, but at the same time serves as a guard to prevent the earth which is loosened by the cultivator from being thrown over upon the young plants and covering them up.

In cultivating cotton it is desirable to run the cultivator as near to the young plants as possible; but the great trouble is in running near to the plants the earth is thrown upon them in such a manner as to cover them up and destroy them or injure their growth.

By means of the guard and cutter the cultivator can be run as close to the plants as may be necessary, and none of the earth be thrown upon them.

The wing I, as the cultivator is drawn along, serves to force the dirt over to one side away from the plant at the same time that it acts as a scraper and cleans away the growing weeds. The guard and cutter is secured in position by means of one bolt, as shown.

Having thus described my invention, I claim—

In combination with a plow or cultivator standard and a cultivator tooth or shovel, a combined guard and cutter, consisting of the vertical wing G, which prevents the earth from being thrown upon the cotton, and the wing I, which serves as a scraper, substantially as shown and described.

In testimony that I claim the foregoing I have hereunto set my hand this 20th day of May, 1880.

RICHARD A. JOHNSON.

Witnesses:
HILL BENTON,
JNO. I. ALEXANDER.